(12) United States Patent
Suemura et al.

(10) Patent No.: US 7,999,026 B2
(45) Date of Patent: Aug. 16, 2011

(54) REACTIVE MONOMER-DISPERSED SILICA SOL AND PRODUCTION METHOD THEREOF, AND CURABLE COMPOSITION AND CURED ARTICLE THEREOF

(75) Inventors: Naohiko Suemura, Sodegaura (JP); Keiko Yoshitake, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 67 days.

(21) Appl. No.: 12/449,328

(22) PCT Filed: Jan. 31, 2008

(86) PCT No.: PCT/JP2008/051518
§ 371 (c)(1),
(2), (4) Date: Aug. 3, 2009

(87) PCT Pub. No.: WO2008/093775
PCT Pub. Date: Aug. 7, 2008

(65) Prior Publication Data
US 2010/0029845 A1      Feb. 4, 2010

(30) Foreign Application Priority Data
Feb. 2, 2007    (JP) ................................ 2007-023740

(51) Int. Cl.
*C08K 3/34*    (2006.01)
(52) U.S. Cl. ........ 524/492; 523/205; 523/209; 523/210; 524/493; 524/791
(58) Field of Classification Search .................. 524/492, 524/493, 791; 523/205, 209, 210
See application file for complete search history.

(56) References Cited

U.S. PATENT DOCUMENTS

| | | |
|---|---|---|
| 3,328,339 A | 6/1967 | Tierney |
| 4,772,660 A | 9/1988 | Kitamura et al. |
| 5,221,497 A | 6/1993 | Watanabe et al. |
| 6,632,489 B1 | 10/2003 | Watanabe et al. |
| 2007/0032560 A1 | 2/2007 | Suemura et al. |

FOREIGN PATENT DOCUMENTS

| | | |
|---|---|---|
| EP | 0 335 195 A2 | 10/1989 |
| EP | 1 114 794 A1 | 7/2001 |
| EP | 1 754 685 A2 | 2/2007 |
| JP | A-62-95130 | 5/1987 |
| JP | A-1-317115 | 12/1989 |
| JP | A-2007-63117 | 3/2007 |
| WO | WO 00/15552 A1 | 3/2000 |
| WO | WO 2006/035709 A1 | 4/2006 |

OTHER PUBLICATIONS

Feb. 5, 2010 Extended European Search Report issued in European Patent Application No. 08 70 4265.

*Primary Examiner* — Edward J Cain
(74) *Attorney, Agent, or Firm* — Oliff & Berridge, PLC

(57) ABSTRACT

Colloidal silica particles dispersed in a reactive monomer may cause the polymerization, degradation, or the like of the reactive monomer by an action of the solid acidity of the surfaces of the particles and a monomer may be polymerized during a process for producing a monomer-dispersed silica sol, or a stable silica sol may not be obtained. In addition, a polymer of a resin formed article etc. obtained by curing a monomer-dispersed silica sol may be deteriorated, degraded, or the like with time. Therefore, there are provided a reactive monomer-dispersed silica sol having high stability by reducing the solid acidity of the surfaces of the colloidal silica particles contained in the reactive monomer-dispersed silica sol, and a production method thereof, and a curable composition using the reactive monomer-dispersed silica sol, and a cured article in which the deterioration, the degradation, or the like of the polymer is suppressed. The present invention provides a reactive monomer-dispersed silica sol containing a colloidal silica particle in which an alkaline earth metal ion is bonded to a surface of the colloidal silica particle.

12 Claims, No Drawings

REACTIVE MONOMER-DISPERSED SILICA SOL AND PRODUCTION METHOD THEREOF, AND CURABLE COMPOSITION AND CURED ARTICLE THEREOF

TECHNICAL FIELD

The present invention relates to a reactive monomer-dispersed silica sol and a production method thereof, and a curable composition containing the reactive monomer-dispersed silica sol and a cured article using the composition.

BACKGROUND ART

The reactive monomer-dispersed silica sol of the present invention is a silica sol in which colloidal silica particles are homogeneously dispersed in a polymerizable organic compound monomer cured by the irradiation of activating energy rays such as ultraviolet (UV) rays, electron beams, γ-rays and X rays, heating, the use of catalysts or the use of curing agents, or the like. Here, curing is referred to as the phenomenon of polymerization or crosslinkage.

A reactive monomer-dispersed silica sol is ultimately converted into a composite material of colloidal silica particles and a polymer by polymerizing the silica sol to which curing catalysts and other additives are added with UV rays or heat, and the composite material is used in applications such as a hard coating for a transparent plastic plate, a lens, a bottle, a film etc., various sealants and synthetic resin-molded articles. At this time, the colloidal silica particles act as a modifier for the polymer and improve, for example the elasticity modulus, the linear expansion coefficient, the glass transition temperature, the hardness, the flexural strength etc. of the polymer. In addition, when the colloidal silica particles have small particle diameters and are advantageously dispersed in a polymer matrix, the above modifying effects can be obtained without impairing the transparency of the polymer. Typically, it is known that when colloidal silica particles having a primary particle diameter of 50 nm or less are homogeneously dispersed in a polymer matrix, a composite material having high transparency in which the optical loss is extremely small can be obtained.

As a method for obtaining a reactive monomer-dispersed silica sol, there is known a method including mixing an organic solvent-dispersed silica sol etc. with a reactive monomer and removing at least a part of a solvent such as the organic solvent (refer to Patent Document 1).

When a reactive monomer-dispersed silica sol is prepared by the method in Patent Document 1, by an action of the solid acidity which the surfaces of the colloidal silica particles have, a polymerization or degradation of the reactive monomer may be caused and the stability of the sol may be impaired. In addition, in a cured article of a curable composition using a reactive monomer-dispersed silica sol, the deterioration, degradation, or the like of the polymer may be caused and a discoloration, a crack, or the like may be generated by an action of the solid acidity of colloidal silica particles.

[Patent Document 1]

Examined Japanese Patent Application Publication No. JP-B-7-35407

DISCLOSURE OF THE INVENTION

Problem to be Solved by the Invention

Colloidal silica particles dispersed in a reactive monomer may cause the polymerization, degradation, or the like of the reactive monomer by an action of the solid acidity of the surfaces of the particles and a monomer may be polymerized during a process for producing a monomer-dispersed silica sol, or a monomer is deteriorated with time, so that a stable silica sol may not be obtained. In addition, a polymer of a resin formed article etc. obtained by curing a monomer-dispersed silica sol may be deteriorated, degraded, or the like with time by an action of the solid acidity of colloidal silica particles.

Therefore, it is an object of the present invention to provide a reactive monomer-dispersed silica sol having high stability by reducing the solid acidity of the surfaces of the colloidal silica particles contained in the reactive monomer-dispersed silica sol, and a production method thereof. It is another object of the present invention to provide a curable composition using the reactive monomer-dispersed silica sol, and a cured article in which the deterioration, the degradation, or the like of the polymer is suppressed.

Means for Solving the Problem

The present invention provides: according to a first aspect, a reactive monomer-dispersed silica sol containing a colloidal silica particle in which an alkaline earth metal ion is bonded to a surface of the colloidal silica particle in a ratio of 0.001 to 0.2 pieces per square nanometer ($nm^2$) of the surface area of the colloidal silica particle;

according to a second aspect, in the reactive monomer-dispersed silica sol according to the first aspect, the alkaline earth metal ion is a calcium ion and/or a magnesium ion;

according to a third aspect, in the reactive monomer-dispersed silica sol according to the first or second aspect, the reactive monomer in the reactive monomer-dispersed silica sol is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure;

according to a fourth aspect, in the reactive monomer-dispersed silica sol according to any one of the first to third aspects, the surface of the colloidal silica particle is surface-modified by a silane compound capable of forming a covalent bond with a silanol group of the colloidal silica particle;

according to a fifth aspect, a production method of the reactive monomer-dispersed silica sol according to the first aspect including the following (A) and (B):

(A): dissolving an alkaline earth metal compound in an organic solvent-dispersed silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle; and (B): exchanging an organic solvent which is a dispersion medium of the organic solvent-dispersed silica sol obtained in (A) with a reactive monomer;

according to a sixth aspect, in the production method of a reactive monomer-dispersed silica sol according to the fifth aspect, the alkaline earth metal compound is an organic acid salt and/or alkoxide of calcium or magnesium;

according to a seventh aspect, in the production method of a reactive monomer-dispersed silica sol according to the fifth aspect, the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure;

according to an eighth aspect, in the production method of a reactive monomer-dispersed silica sol according to the fifth aspect, further in (A), the colloidal silica particle is surface-modified by adding a silane compound capable of forming a covalent bond with a silanol group of the colloidal silica particle to an organic solvent-dispersed silica sol before and/or after an alkaline earth metal compound is dissolved in the sol;

according to a ninth aspect, a production method of the reactive monomer-dispersed silica sol as described in the first aspect including the following (A'), (B') and (C'):

(A'): dissolving an alkaline earth metal compound in an aqueous silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle;

(B'): exchanging water which is a dispersion medium of the aqueous silica sol obtained in (A') with an organic solvent to obtain an organic solvent-dispersed silica sol; and (C'): exchanging an organic solvent which is a dispersion medium of the organic solvent-dispersed silica sol obtained in (B') with a reactive monomer;

according to a tenth aspect, in the production method of a reactive monomer-dispersed silica sol according to the ninth aspect, the alkaline earth metal compound is at least one type of compound selected from a group consisting of calcium hydroxide, magnesium hydroxide, calcium oxide and magnesium oxide;

according to an eleventh aspect, in the production method of a reactive monomer-dispersed silica sol according to the ninth aspect, the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure;

according to a twelfth aspect, in the production method of a reactive monomer-dispersed silica sol according to the ninth aspect, the colloidal silica particle is surface-modified, either by adding a silane compound capable of forming a covalent bond with a silanol group of the colloidal silica particle to the aqueous silica sol before and/or after an alkaline earth metal is dissolved in the sol in (A'), or by adding the silane compound to the organic solvent-dispersed silica sol in (B');

according to a thirteenth aspect, a production method of the reactive monomer-dispersed silica sol according to the first aspect including the following (A') and (C"):

(A'): dissolving an alkaline earth metal compound in an aqueous silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle; and (C"): exchanging water which is a dispersion medium of the aqueous silica sol obtained in (A') with a reactive monomer;

according to a fourteenth aspect, in the production method of a reactive monomer-dispersed silica sol according to the thirteenth aspect, the alkaline earth metal compound is at least one type of compound selected from a group consisting of calcium hydroxide, magnesium hydroxide, calcium oxide and magnesium oxide;

according to a fifteenth aspect, in the production method of a reactive monomer-dispersed silica sol according to the thirteenth aspect, the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure;

according to a sixteenth aspect, in the production method of a reactive monomer-dispersed silica sol according to the thirteenth aspect, further in (A'), the colloidal silica particle is surface-modified by adding a silane compound capable of forming a covalent bond with a silanol group of the colloidal silica particle to the aqueous silica sol before and/or after an alkaline earth metal compound is dissolved in the sol;

according to a seventeenth aspect, a curable composition containing the reactive monomer-dispersed silica sol according to any one of the first to fourth aspects and a monomer curing agent; and according to an eighteenth aspect, a cured article obtained from the curable composition according to the seventeenth aspect.

Effects of the Invention

In the reactive monomer-dispersed silica sol of the present invention, an alkaline earth metal ion is bonded to the surface of a colloidal silica particle, so that the solid acidity of the surface of the colloidal silica particle is reduced. Therefore, in the production process of the reactive monomer-dispersed silica sol of the present invention, in comparison with the case where a conventional silica sol in which an alkaline earth metal ion is not bonded to the surface of the colloidal silica particle is used, the polymerization or degradation of a reactive monomer is suppressed and a reactive monomer-dispersed silica sol thus obtained has high dispersion stability and high storage stability. Furthermore, in a cured article using the curable composition of the present invention, the deterioration or degradation of a cured polymer is less likely to occur due to a reduced solid acidity of the surface of the colloidal silica particle.

BEST MODES FOR CARRYING OUT THE INVENTION

Hereinafter, the reactive monomer-dispersed silica sol of the present invention will be described in detail. The reactive monomer-dispersed silica sol of the present invention is a reactive monomer-dispersed silica sol containing colloidal silica particles in which alkaline earth metal ions are bonded to the surfaces of the colloidal silica particles in a ratio of 0.001 to 0.2 pieces per square nanometer of the surface area of the colloidal silica particle.

The dispersion medium of the reactive monomer-dispersed silica sol of the present invention may be one type of reactive monomer, a mixture of two or more types of reactive monomers, or a mixture of the reactive monomer(s) and an organic solvent. When the dispersion medium is a mixture of the reactive monomer(s) and an organic solvent, the mass ratio of reactive monomer(s) and organic solvent is in a range of 100:0 to 50:50.

In addition, the silica concentration in the reactive monomer-dispersed silica sol of the present invention is in a range of 5 to 70% by mass.

The reactive monomer of the present invention is a polymerizable compound having, in the molecule of the monomer, an ethylenic unsaturated bond, a polymerizable compound having an epoxy ring, a polymerizable compound having an oxetane ring, or a polymerizable compound having a vinyl ether structure. In addition, the reactive monomer of the present invention is preferably a compound that is in a liquid form at 50° C.

Examples of the polymerizable compound having an ethylenic unsaturated bond include unsaturated carboxylic acid compounds such as acrylic acid, methacrylic acid, itaconic acid, crotonic acid, maleic acid and phthalic acid. In addition, examples of the polymerizable compound also include unsaturated carboxylic acid ester compounds or unsaturated carboxylic acid amide compounds derived from the above unsaturated carboxylic acid compounds and alcohol compounds or amine compounds, such as acrylate ester compounds, methacrylate ester compounds, itaconate ester compounds, crotonate ester compounds, maleate ester compounds, phthalate ester compounds, acrylamide compounds, methacrylamide compounds, itaconic acid amide compounds, crotonic acid amide compounds, maleic acid amide compounds and phthalic acid amide compounds. Though the alcohol compound is not particularly limited, examples thereof include polyol compounds having 2 to 6 hydroxyl groups, such as ethylene glycol, triethylene glycol, tetraethylene glycol, tris (2-hydroxylethyl) isocyanuric acid, triethanolamine and pentaerythritol. Though the amine compound is not particularly limited, examples thereof include polyamine compounds having 2 to 6 primary or secondary amino groups, such as ethylenediamine, diaminocyclohexane, diaminonaphthalene, 1,4-bis(aminomethyl)cyclohexane, 3,3',4,4'-tetraminobiphenyl and tris(2-aminoethyl)amine.

Specific examples of the polymerizable compound having an ethylenic unsaturated bond include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis(4-((meth)acryloxydiethoxy)phenyl)propane, 3-phenoxy-2-propanoyl acrylate, 1,6-bis(3-acryloxy-2-hydroxypropyl)-hexyl ether, trimethylolpropane tri(meth)acrylate, glycerol tri(meth)acrylate, tris-(2-hydroxylethyl) isocyanurate ester (meth)acrylate, pentaerythritol tri(meth)acrylate, pentaerythritol tetra(meth)acrylate, dipentaerythritol tri(meth)acrylate, dipentaerythritol penta(meth)acrylate, dipentaerythritol hexa(meth)acrylate, tripentaerythritol octa(meth)acrylate, tripentaerythritol hepta(meth)acrylate, 2-hydroxypropyl (meth)acrylate, 2-ethylhexyl (meth)acrylate, 2-norbornylmethyl methacrylate, 2-hydroxy-3-phenoxypropyl (meth)acrylate, 2-hydroxyethyl (meth)acrylate, 2,2-dimethylbutyl acrylate, 2-hydroxybutyl (meth)acrylate, n-propyl (meth)acrylate, n-butyl (meth)acrylate, isobutyl (meth)acrylate, t-butyl (meth)acrylate, n-hexyl (meth)acrylate, n-pentyl (meth)acrylate, n-octyl (meth)acrylate, 2-methoxylethyl (meth)acrylate, 2-methoxymethoxyethyl acrylate, 3-pentyl (meth)acrylate, 3-methyl-2-norbornylmethyl methacrylate, 3-methoxybutyl (meth)acrylate, 4-hydroxybutyl (meth)acrylate, 4-methyl-2-propylpentyl acrylate, 5-norbornen-2-yl-methyl methacrylate, isopropyl (meth)acrylate, n-octadecyl (meth)acrylate, n-nonyl (meth)acrylate, sec-butyl (meth)acrylate, t-pentyl (meth)acrylate, ethyl α-hydroxymethylacrylate, butyl α-hydroxymethylacrylate, methyl α-hydroxymethylacrylate, (meth)acrylic acid, n-stearyl acrylate, isooctyl acrylate, isononyl acrylate, isobornyl (meth)acrylate, ethyl (meth)acrylate, ethylcarbitol acrylate, ethoxyethyl (meth)acrylate, ethoxyethoxyethyl (meth)acrylate, ethoxydiethylene glycol acrylate, cyclohexyl (meth)acrylate, cyclohexylmethyl (meth)acrylate, cyclopentyl acrylate, dicyclopentenyloxyethyl acrylate, cetyl acrylate, tetrahydrofurfuryl (meth)acrylate, phenoxyethyl (meth)acrylate, (meth)acryloyloxyethyl hydrogen phthalate, benzyl (meth)acrylate, methyl (meth)acrylate, methoxyethyl (meth)acrylate, methoxyethoxyethyl (meth)acrylate, methoxypolyethylene glycol (meth)acrylate, lauryl (meth)acrylate, 1,3-butanediol di(meth)acrylate, 1,4-butanediol di(meth)acrylate, 1,6-hexanediol di(meth)acrylate, 1,9-nonandiol di(meth)acrylate, allylated cyclohexyl di(meth)acrylate, glycerin di(meth)acrylate, dicyclopentanyl di(meth)acrylate, tricyclodecane dimethanol di(meth)acrylate, trimethylolpropane di(meth)acrylate, neopentyl glycol adipate di(meth)acrylate, neopentyl glycol di(meth)acrylate, neopentyl glycol hydroxypivalate ester diacrylate, ethoxylated trimethylolpropane tri(meth)acrylate, glycerinpropoxy tri(meth)acrylate, trimethylolpropane polyethoxy tri(meth)acrylate, propionic acid-modified dipentaerythritol tri(meth)acrylate, ditrimethylolpropane tetra(meth)acrylate, propionic acid-modified dipentaerythritol tetra(meth)acrylate, propoxylated pentaerythritol tetra(meth)acrylate, propionic acid-modified dipentaerythritol penta(meth)acrylate, glycidyl methacrylate, N,N-dimethyl acrylamide, N,N-diethyl acrylamide, vinylbenzene, divinylbenzene, vinyltoluene, styrene, α-methylstyrene and p-methylstyrene. Here, for example ethylene glycol di(meth)acrylate means ethylene glycol diacrylate and ethylene glycol dimethacrylate.

Examples of the polymerizable compound having an ethylenic unsaturated bond in the present invention also include urethane compounds obtained by a reaction between polyvalent isocyanate compounds and hydroxyalkyl unsaturated carboxylic acid ester compounds, compounds obtained by a reaction between polyvalent epoxy compounds and hydroxyalkyl unsaturated carboxylic acid ester compounds, diallyl ester compounds such as diallyl phthalate, and divinyl compounds such as divinyl phthalate.

Though the polymerizable compound having an epoxy ring is not particularly limited, compounds having 1 to 6 epoxy ring(s) can be used. Examples of the polymerizable compound include compounds having two or more glycidyl ether structures or glycidyl ester structures which can be produced from compounds having two or more hydroxyl groups or carboxyl groups, such as diol compounds, triol compounds, dicarboxylic acid compounds and tricarboxylic acid compounds, and glycidyl compounds such as epichlorohydrin.

Specific examples of the polymerizable compound having an epoxy ring include 1,4-butanediol diglycidyl ether, 1,2-epoxy-4-(epoxyethyl)cyclohexane, glycerol triglycidyl ether, diethylene glycol diglycidyl ether, 2,6-diglycidyl phenylglycidyl ether, 1,1,3-tris(p-(2,3-epoxypropoxy)phenyl) propane, 1,2-cyclohexane dicarboxylic acid diglycidyl ester, 4,4'-methylene bis(N,N-diglycidyl aniline), 3,4-epoxycyclohexylmethyl-3,4-epoxycyclohexane carboxylate, trimethylolethane triglycidyl ether, triglycidyl-p-aminophenol, tetraglycidyl methaxylenediamine, tetraglycidyl diaminodiphenylmethane, tetraglycidyl-1,3-bisaminomethylcyclohexane, bisphenol A diglycidyl ether, bisphenol S diglycidyl ether, pentaerythritol tetraglycidyl ether, resorcinol diglycidyl ether, diglycidyl phthalate ester, neopentyl glycol diglycidyl ether, polypropylene glycol diglycidyl ether, tetrabromobisphenol A diglycidyl ether, bisphenol hexafluoroacetone diglycidyl ether, pentaerythritol diglycidyl ether, hydrogenated bisphenol A diglycidyl ether, tris(2,3-epoxypropyl)isocyanurate, 1-(2,3-di(propionyloxy))-3,5-bis(2,3-epoxypropyl)-1,3,5-triazine-2,4,6(1H,3H,5H)-trione, 1,3-bis(2,3-di(propionyloxy))-5-(2,3-epoxypropyl)-1,3,5-triazine-2,4,6(1H,3H,5H)-trione, monoallyl diglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethyleneglycol diglycidyl ether, phenyl glycidyl ether, p-tertiarybutylphenyl glycidyl ether, adipic acid diglycidyl ether, o-phthalic acid diglycidyl ether, dibromophenyl glycidyl ether, 1,2,7,8-diepoxyoctane, 1,6-dimethylol perfluorohexane diglycidyl ether, 4,4'-bis(2,3-epoxypropoxyperfluoroisopropyl)diphenyl ether, 2,2-bis(4-glycidyloxyphenyl)propane, 3,4-epoxycyclohexylmethyl-3',4'-epoxycyclohexane carboxylate, 3,4-epoxycyclohexyloxirane, 2-(3,4-epoxycyclohexyl)-3',4'-epoxy-1,3-dioxane-5-spirocyclohexane, 1,2-ethylenedioxybis(3,4-iepoxycyclohexylmethane), 4',5'-epoxy-2'-methylcyclohexylmethyl-4,5-epoxy-2-methylcyclohexane carboxylate, ethylene glycol-bis(3,4-epoxycyclohexane carboxylate), bis(3,4-epoxycyclohexylmethyl)adipate, and bis(2,3-epoxycyclopentyl)ether.

Though the polymerizable compound having an oxetane ring is not particularly limited, compounds having 1 to 6 oxetane ring(s) can be used. Examples of the polymerizable compound include 3-ethyl-3-hydroxymethyloxetane, 3-ethyl-3-(phenoxymethyl)oxetane, 3,3-diethyloxetane and 3-ethyl-3-(2-ethylhexyloxymethyl)oxetane, 1,4-bis(((3-ethyl-3-oxetanyl)methoxy)methyl)benzene, di((3-ethyl-3-oxetanyl)methyl)ether and pentaerythritol tetrakis((3-ethyl-3-oxetanyl)methyl)ether.

Though the polymerizable compound having a vinylether structure is not particularly limited, compounds having 1 to 6 vinylether structure(s) can be used. Examples of the polymerizable compound include vinyl-2-chloroethyl ether, vinyl-n-butyl ether, 1,4-cyclohexanedimethanol divinyl ether, vinyl glycidyl ether, bis(4-(vinyloxymethyl)cyclohexylmethyl) glutarate, tri(ethylene glycol) divinyl ether, divinyl adipate ester, diethylene glycol divinyl ether, tris(4-(vinyloxy)butyl) trimellitate, bis(4-(vinyloxy)butyl)terephthalate, bis(4-(vinyloxy)butyl)isophthalate, ethylene glycol divinyl ether, 1,4-butanediol divinyl ether, tetramethylene glycol divinyl ether, tetraethylene glycol divinyl ether, neopentyl glycol divinyl ether, trimethylolpropane trivinyl ether, trimethylolethane trivinyl ether, hexanediol divinyl ether, 1,4-cyclohexanediol divinyl ether, tetraethylene glycol divinyl ether, pentaerythritol divinyl ether, pentaerythritol trivinyl ether and cyclohexanedimethanol divinyl ether.

The silica sol as a raw material in the present invention is an aqueous silica sol produced by a known method using a water glass as a raw material, and an organic solvent-dispersed silica sol which is obtained by exchanging water as a dispersion medium in the aqueous silica sol with an organic solvent.

The aqueous silica sol is a sol in which colloidal silica particles having a specific surface area of 5.5 to 550 m$^2$/g are stably dispersed and a particle form of the colloidal silica particles may be any particle forms known in the present technology field. The colloidal silica particles have a specific surface area of more preferably 27 to 550 m$^2$/g, most preferably 55 to 550 m$^2$/g. The particle diameter (primary particle diameter) of each of the colloidal silica particles is a diameter of the specific surface area calculated using a specific surface area S (m$^2$/g) obtained by a nitrogen adsorption method (BET method) and according to the equation: D(nm)=2720/S. Therefore, the colloidal silica particles of the present invention have a particle diameter of 5 to 500 nm, more preferably 5 to 100 nm, most preferably 5 to 50 nm. When the colloidal silica particles have a particle diameter of less than 5 nm, the stability of the aqueous silica sol or the organic solvent-dispersed silica sol is lowered and it is difficult to increase the silica concentration, so that the production efficiency of the reactive monomer-dispersed silica sol is extremely lowered, which is not preferred. On the other hand, when the colloidal silica particles have a particle diameter more than 500 nm, the sedimentation property of the colloidal silica particles is large, so that it is difficult to maintain a homogeneous dispersing state of the colloidal silica particles in the aqueous silica sol or the organic solvent-dispersed silica sol and the transparency of the cured article of the present invention is lowered, which is not preferred.

When there exist alkali metal ions liberated in an aqueous silica sol, the stability of a sol in which an alkaline earth metal compound is added to the aqueous silica sol or a sol in which the medium of the aqueous silica sol has been exchanged with an organic solvent, is lowered. Therefore, as the aqueous silica sol, an acidic silica sol from which alkali metal ions have been removed beforehand is preferred. An acidic aqueous silica sol can be prepared, for example by removing cations such as free alkali metal ions from an alkaline aqueous silica sol by a method such as an ion exchange. In addition, when anions are contained in an acidic aqueous silica sol, it is further preferred to use an acidic aqueous silica sol in which most of or all of the anions have been removed.

Though the silica concentration of the aqueous silica sol is not particularly limited, it is generally 5 to 70% by mass and an aqueous silica sol having a silica concentration of 10 to 50% by mass is preferably used.

Examples of the aqueous silica sol used as a raw material include SNOWTEX (registered trademark) OXS (an acidic aqueous silica sol; manufactured by Nissan Chemical Industries, Ltd.), SNOWTEX (registered trademark) OS (an acidic aqueous silica sol; manufactured by Nissan Chemical Industries, Ltd.), SNOWTEX (registered trademark) O (an acidic aqueous silica sol; manufactured by Nissan Chemical Industries, Ltd.), SNOWTEX (registered trademark) O-40 (an acidic aqueous silica sol; manufactured by Nissan Chemical Industries, Ltd.), SNOWTEX (registered trademark) OL (an acidic aqueous silica sol; manufactured by Nissan Chemical Industries, Ltd.) and SNOWTEX (registered trademark) OUP (an acidic aqueous silica sol; manufactured by Nissan Chemical Industries, Ltd.).

The organic solvent-dispersed silica sol as a raw material in the present invention is obtained by exchanging water as the dispersion medium of the above aqueous silica sol with an organic solvent. The exchange with an organic solvent can be performed by a publicly-known method such as a distillation exchange method and an ultrafiltration method.

As the dispersion medium of the organic solvent-dispersed silica sol of the present invention, there can be used unpolymerizable organic solvents such as alcohols, ethers, esters, ketones and hydrocarbons.

Examples of the alcohols include methanol, ethanol, 1-propanol, 2-propanol, 1-butanol, 2-methyl-1-propanol, 2-butanol, 2-methyl-2-propanol, ethylene glycol, glycerin, propylene glycol, triethylene glycol, polyethylene glycol, benzyl alcohol, 1,5-pentanediol and diacetone alcohol.

Examples of the ethers include diethyl ether, dibutyl ether, tetrahydrofuran, dioxane, ethylene glycol monomethyl ether, ethylene glycol monopropyl ether, propylene glycol monomethyl ether, propylene glycol monoethyl ether, diethylene glycol monomethyl ether, diethylene glycol monoethyl ether and diethylene glycol monobutyl ether.

Examples of the esters include ethyl formate, methyl acetate, ethyl acetate, propyl acetate, butyl acetate, ethylene glycol monoethyl ether acetate and ethylene glycol monobutyl ether acetate.

Examples of the ketones include acetone, methyl ethyl ketone, 2-pentanone, 3-pentanone, methyl isobutyl ketone, 2-heptanone and cyclohexanone.

Examples of the hydrocarbons include n-hexane, cyclohexane, benzene, toluene, xylene, solvent naphtha, dichloromethane and trichloroethylene.

Examples of the other organic solvent include acetonitrile, acetoamide, N,N-dimethylformamide, dimethyl sulfoxide, N,N-dimethylacetoamide and N-methylpyrrolidone.

These organic solvents may be used individually or in combination of two or more types thereof. In addition, it is preferred that the organic solvent has an excellent compatibility with the reactive monomer used in the present invention, a low reactivity with the reactive monomer and a boiling point lower than that of the reactive monomer.

If the compatibility of the organic solvent with the reactive monomer is poor, a layer of the organic solvent-dispersed silica sol and a layer of the reactive monomer are separated from each other when the reactive monomer is added to the organic solvent-dispersed silica sol. Thus, the colloidal silica particles are not transferred to the layer of the reactive monomer while exchanging an organic solvent for the dispersion medium with a reactive monomer. As a result, a desired reactive monomer-dispersed silica sol may not be obtained.

When the reactivity between the organic solvent and the reactive monomer is high, the stability of the obtained reactive monomer-dispersed silica sol may become poor, or a curing failure may occur in the cured article obtained by using the reactive monomer-dispersed silica sol. For example, when the reactive monomer is an epoxy monomer and the dispersion medium of the organic solvent-dispersed silica sol is an alcohol, a ring opening of the epoxy monomer may be caused by the alcohol, and consequently, a curing failure of the final cured article may occur, which is not preferred.

If the organic solvent has a boiling point higher than that of the reactive monomer, the evaporation of the reactive monomer is preferentially caused while exchanging the organic solvent with the reactive monomer. Thus, the exchange requires a large amount of the reactive monomer, which is not preferred.

As the organic solvent-dispersed silica sol used as a raw material in the present invention, a commercially available silica sol may be used. Examples of such silica sol include: MA-ST-S (a methanol-dispersed silica sol; manufactured by Nissan Chemical Industries, Ltd.); MT-ST (a methanol-dispersed silica sol; manufactured by Nissan Chemical Industries, Ltd.); MA-ST-UP (a methanol-dispersed silica sol; manufactured by Nissan Chemical Industries, Ltd.); MA-ST-MS (a methanol-dispersed silica sol; manufactured by Nissan Chemical Industries, Ltd.); MA-ST-L (a methanol-dispersed silica sol; manufactured by Nissan Chemical Industries, Ltd.); IPA-ST-S (an isopropanol-dispersed silica sol; manufactured by Nissan Chemical Industries, Ltd.); IPA-ST (an isopropanol-dispersed silica sol; manufactured by Nissan Chemical Industries, Ltd.); IPA-ST-UP (an isopropanol-dispersed silica sol; manufactured by Nissan Chemical Industries, Ltd.); IPA-ST-MS (an isopropanol-dispersed silica sol; manufactured by Nissan Chemical Industries, Ltd.); IPA-ST-L (an isopropanol-dispersed silica sol; manufactured by Nissan Chemical Industries, Ltd.); IPA-ST-ZL (an isopropanol-dispersed silica sol; manufactured by Nissan Chemical Industries, Ltd.); NPC-ST-30 (a n-propyl cellosolve-dispersed silica sol; manufactured by Nissan Chemical Industries, Ltd.); PGM-ST (a 1-methoxy-2-propanol-dispersed silica sol; manufactured by Nissan Chemical Industries, Ltd.); DMAC-ST (a dimethylacetoamide-dispersed silica sol; manufactured by Nissan Chemical Industries, Ltd.); XBA-ST (a solvent mixture of xylene and n-butanol-dispersed silica sol; manufactured by Nissan Chemical Industries, Ltd.); EAC-ST (an ethyl acetate-dispersed silica sol; manufactured by Nissan Chemical Industries, Ltd.); PMA-ST (a propylene glycol monomethyl ether acetate-dispersed silica sol; manufactured by Nissan Chemical Industries, Ltd.); MEK-ST (a methyl ethyl ketone-dispersed silica sol; manufactured by Nissan Chemical Industries, Ltd.); MEK-ST-UP (a methyl ethyl ketone-dispersed silica sol; manufactured by Nissan Chemical Industries, Ltd.); MEK-ST-MS (a methyl ethyl ketone-dispersed silica sol; manufactured by Nissan Chemical Industries, Ltd.); MEK-ST-L (a methyl ethyl ketone-dispersed silica sol; manufactured by Nissan Chemical Industries, Ltd.); and MIBK-ST (a methyl isobutyl ketone-dispersed silica sol; manufactured by Nissan Chemical Industries, Ltd.).

Examples of the alkaline earth metal ion to be bonded to the colloidal silica particles in the present invention include a beryllium ion ($Be^{2+}$), a magnesium ion ($Mg^{2+}$), calcium ion ($Ca^{2+}$), a strontium ion ($Sr^{2+}$), a barium ion ($Ba^{2+}$) and a radium ion ($Ra^{2+}$). Among them, a magnesium ion and a calcium ion are preferred in terms of availability and easy handling of compounds thereof.

In the present invention, as the alkaline earth metal compound added to the aqueous silica sol used as a raw material, it is possible to use oxides, hydroxides and salts (inorganic acid salts such as nitrates, sulfates, phosphates, hydrochlorides and carbonates, and organic acid salts such as carboxylates) of alkaline earth metals. Among them, it is preferable to use hydroxides and oxides of alkaline earth metals, and especially preferable to use calcium hydroxide, magnesium hydroxide, calcium oxide and magnesium oxide, because such compounds are easily handled and contain no unnecessary anions.

In the present invention, as the alkaline earth metal compound added to the organic solvent-dispersed silica sol used as a raw material, it is possible to use organic acid salts of alkaline earth metals and/or alkaline earth metal alkoxides which are soluble in an organic solvent which is the dispersion medium of the silica sol. Examples of the organic acid salt of alkaline earth metals include calcium methacrylate, magnesium methacrylate, calcium acrylate, magnesium acrylate, calcium acetate, magnesium acetate and calcium lactate. Examples of the alkaline earth metal alkoxide include calcium dimethoxide, calcium methoxyethoxide, calcium diethoxide, calcium methoxyisopropoxide, calcium ethoxyisopropoxide, calcium diisopropoxide, magnesium dimethoxide, magnesium methoxyethoxide, magnesium diethoxide, magnesium ethoxyisopropoxide and magnesium diisopropoxide.

In the present invention, the amount of the alkaline earth metal ion bonded to colloidal silica particles per square nanometer of the surface area of the colloidal silica particle is preferably 0.001 to 0.2 pieces, more preferably 0.01 to 0.1 pieces. When the amount of the alkaline earth metal ion bonded to colloidal silica particles per square nanometer of the colloidal silica particle is less than 0.001 pieces, a satisfactory effect of reducing the solid acidity cannot be expected. On the other hand, when the amount of the alkaline earth metal ion bonded to colloidal silica particles per square nanometer of the surface area of the surface of the colloidal silica particle is more than 0.2 pieces, the stability of the reactive monomer-dispersed silica sol to be obtained is lowered.

The amount of the alkaline earth metal ion bonded to colloidal silica particles per square nanometer of the surface area of the colloidal silica particle is calculated from the specific surface area ($m^2/g$) of the colloidal silica particle obtained by the BET method and the additive amount of the alkaline earth metal compound.

In addition, the colloidal silica particles contained in the reactive monomer-dispersed silica sol of the present invention are preferably surface-modified by a silane compound capable of forming a covalent bond by a reaction of the colloidal silica particles with a silanol group existing in the surface of the colloidal silica particles. By surface-modifying the colloidal silica particles with a silane compound, it is possible to suppress the aggregation of the colloidal silica particles by the alkaline earth metal ion when an alkaline earth metal compound is added to the silica sol. In addition, by this surface-modification, the dispersibility of the colloidal silica particles in the reactive monomer may be enhanced.

Examples of the silane compound capable of forming a covalent bond by being reacted with a silanol group of the colloidal silica particles include silazane, siloxane, or alkoxysilane, and partial hydrolysates of silazane, siloxane, or alkoxysilane, or oligomers such as a polymerized dimmer to pentamer of silazane, siloxane, or alkoxysilane.

Examples of the silazane include hexamethyldisilazane and hexaethyldisilazane.

Examples of the siloxane include hexamethyldisiloxane, 1,3-dibutyltetramethyldisiloxane, 1,3-diphenyltetramethyldisiloxane, 1,3-divinyltetramethyldisiloxane, hexaethyldisiloxane and 3-glycidoxypropylpentamethyldisiloxane.

Examples of the alkoxysilane include trimethylmethoxysilane, trimethylethoxysilane, trimethylpropoxysilane, phenyldimethylmethoxysilane, chloropropyldimethylmethoxysilane, dimethyldimethoxysilane, methyltrimethoxysilane, tetramethoxysilane, tetraethoxysilane, tetrapropoxysilane, tetrabutoxysilane, ethyltrimethoxysilane, dimethyldiethoxysilane, propyltriethoxysilane, n-butyltrimethoxysilane, n-hexyltrimethoxysilane, n-octyltriethoxysilane, n-octylmethyldiethoxysilane, n-octadecyltrimethoxysilane, phenyltrimethoxysilane, phenylmethyldimethoxysilane, phenetyltrimethoxysilane, dodecyltrimethoxysilane, n-octadecyltriethoxysilane, phenyltrimethoxysilane, diphenyldimethoxysilane, vinyltrimethoxysilane, vinyltriethoxysilane, vinyltris(β-methoxyethoxy)silane, γ-methacryloxypropyltrimethoxysilane, γ-acryloxypropyltrimethoxysilane, γ-(methacryloxypropyl)methyldimethoxysilane, γ-methacryloxypropylmethyldiethoxysilane, γ-methacryloxypropyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-β-(aminoethyl) γ-(aminopropyl)methyldimethoxysilane, N-β-(aminoethyl)γ-(aminopropyl)trimethoxysilane, N-β-(aminoethyl)γ-(aminopropyl)triethoxysilane, γ-aminopropyltrimethoxysilane, γ-aminopropyltriethoxysilane, N-phenyl-γ-aminopropyltrimethoxysilane, γ-mercaptopropyltrimethoxysilane, 3-isocyanatepropyltriethoxysilane, trifluoropropyltrimethoxysilane, heptadecatrifluoropropyltrimethoxysilane, n-decyltrimethoxysilane, dimethoxydiethoxysilane, bis(triethoxysilyl)ethane and hexaethoxydisiloxane.

These silane compounds may be used individually or in combination of two or more types thereof. In addition, silane compounds having functional groups capable of bonding colloidal silica particles with the polymer while curing the curable composition of the present invention can enhance the properties of the cured article, so that such silane compounds are preferred.

The additive amount of the silane compounds per square meter of the surface of the colloidal silica particles contained in the silica sol is preferably 0.1 to 20 μmol. When the additive amount of the silane compounds is less than 0.1 $\mu mol/m^2$, a satisfactory effect of surface modification cannot be obtained. On the other hand, when the additive amount is more than 20 $\mu mol/m^2$, a large amount of the silane compounds that are not bonded to the colloidal silica particles remains, which is not preferred.

Hereinafter, the production method of the reactive monomer-dispersed silica sol of the present invention will be described in detail.

A first method of the production method of the reactive monomer-dispersed silica sol of the present invention includes the following processes (A) and (B):

(A): dissolving an alkaline earth metal compound in an organic solvent-dispersed silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle; and (B): exchanging an organic solvent which is a dispersion medium of the organic solvent-dispersed silica sol obtained in the process (A) with a reactive monomer.

In the process (A), the organic solvent-dispersed silica sol is heated to a temperature ranging from the melting point to boiling point of the organic solvent and while stirring the silica sol, added thereto is an alkaline earth metal compound soluble in the organic solvent in a state of a powder, a solution in water or in an organic solvent, or a slurry. After adding the alkaline earth metal compound, the resultant mixture is thoroughly stirred to dissolve thoroughly the alkaline earth metal compound in the organic solvent-dispersed silica sol. In the process (A), an alkaline earth metal ion is bonded to the surface of the colloidal silica particle. The amount of the alkaline earth metal ion bonded to colloidal silica particles per square nanometer of the surface area of the colloidal silica particles is preferably 0.001 to 0.2 pieces, more preferably 0.01 to 0.1 pieces. The bonded amount of the alkaline earth metal ion per square nanometer of the surface area of the colloidal silica particles is calculated from the specific surface area ($m^2/g$) of the colloidal silica particles obtained by the BET method and the additive amount of the alkaline earth metal compound.

Next, in the process (B), a reactive monomer is added to the organic solvent-dispersed silica sol containing colloidal silica particles to which an alkaline earth metal ion is bonded which is obtained in the process (A), and while stirring the resultant mixture, at least a part of the organic solvent is distilled off at room temperature or under heating, under a reduced pressure or a normal pressure to obtain a reactive monomer-dispersed silica sol. The condition for exchanging the organic solvent with a reactive monomer may be a condition under which the organic solvent can be distilled off without causing the polymerization or degradation of the reactive monomer, and the exchange may be performed while appropriately controlling the pressure and the liquid temperature in a container used for the exchange. While exchanging the organic solvent with a reactive monomer, all of the necessary amount of the reactive monomer is added to the organic solvent-dispersed silica sol and thereafter, the organic solvent may be distilled off, or while distilling-off the organic solvent in the organic solvent-dispersed silica sol, the exchange may be performed by adding the reactive monomer gradually to the organic solvent-dispersed silica sol. When distilling-off the organic solvent, care should be taken to ensure that gelation does not occur due to an excessively high silica concentration in the silica sol.

The reactive monomer-dispersed silica sol of the present invention may be prepared by distilling-off most of all of the organic solvent in the organic solvent-dispersed silica sol such that silica particles are dispersed in almost only a reactive monomer, or may be prepared by remaining the organic solvent for the purpose of preventing an increase in the viscosity of the silica sol or the like such that silica particles are dispersed in a mixed dispersion medium of the organic solvent and the reactive monomer. The mass ratio between the reactive monomer and the organic solvent in the mixed dispersion medium is preferably in a range of 100:0 to 50:50.

A second method of the production method of the reactive monomer-dispersed silica sol of the present invention includes the following processes (A'), (B') and (C'):

(A'): dissolving an alkaline earth metal compound in an aqueous silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle;

(B'): exchanging water which is a dispersion medium of the aqueous silica sol obtained in the process (A') with an organic solvent; and (C'): exchanging an organic solvent which is a dispersion medium of the organic solvent-dispersed silica sol obtained in the process (B') with a reactive monomer.

The process (A') is a process for bonding an alkaline earth metal ion to the surface of the colloidal silica particle contained in an aqueous silica sol in a ratio of 0.001 to 0.2 pieces per square nanometer of the surface area of the colloidal silica particle. The liquid temperature of the aqueous silica sol used serving as a raw material is set at 5 to 100° C. and while stirring the silica sol, an alkaline earth metal compound in the state of a powder, an aqueous solution or a slurry as an aqueous dispersion is added to the silica sol. After the alkaline earth metal compound has been added, the resultant mixture is thoroughly stirred to dissolve thoroughly the alkaline earth metal compound in the aqueous silica sol.

The amount of the alkaline earth metal compound added to the aqueous silica sol is an amount in which a ratio of the alkaline earth metal ion is 0.001 to 0.2 pieces, more preferably 0.01 to 0.1 pieces per square nanometer of the surface area of the colloidal silica particle contained in the sol. When anions are contained in the aqueous silica sol in a large amount or when an alkaline earth metal salt is used as the alkaline earth metal compound, the bonding of the alkaline earth metal ion to the surface of the colloidal silica particle is inhibited depending on the type of the anion contained. Therefore, after the alkaline earth metal compound is added, it is preferred that anions are partially or entirely removed. Examples of the method for removing anions include an ion-exchange method and an ultrafiltration method. By reducing anions or removing the anions entirely, the alkaline earth metal ion is stably bonded to the surface of the colloidal silica particle.

The process (B') is a process for exchanging water which is a dispersion medium of the aqueous silica sol obtained in the process (A') containing colloidal silica particles in which the alkaline earth metal ion is bonded to the surface of the colloidal silica particle in a ratio of 0.001 to 0.2 pieces per square nanometer of the surface area of the colloidal silica particle with an organic solvent. For the exchange with an organic solvent in the aqueous silica sol, any method in publicly-known techniques may be used. Examples of the method include a distillation-exchange method and an ultrafiltration method.

When the organic solvent is a hydrophobic organic solvent such as methyl ethyl ketone, methyl isobutyl ketone, ethyl acetate or toluene, a method can be applied in which the surface of the colloidal silica particle of the aqueous silica sol is subjected to a hydrophobic treatment and then the dispersion medium is exchanged with a desired solvent. As a method of the hydrophobic treatment, the following methods are known: a method for esterifying a silanol group in the surface of the colloidal silica particle by heating an aqueous silica sol in the coexistence of excessive alcohol (Japanese Patent Application Publication No. JP-A-57-196717); and a method for treating the surface of silica with a silylating agent or a silane coupling agent (Japanese Patent Application Publication Nos. JP-A-58-145614, JP-A-03-187913 and JP-A-11-43319).

The process (C') is a process for exchanging an organic solvent which is a dispersion medium of the organic solvent-dispersed silica sol obtained in the process (B'), with a reactive monomer. The method for exchanging an organic solvent with a reactive monomer can be performed in a manner similar to the process (B) in the first method of the production method of the present invention.

A third method of the production method of the reactive monomer-dispersed silica sol of the present invention includes the following processes (A') and (C"):

(A'): dissolving an alkaline earth metal compound in an aqueous silica sol in an amount in which an alkaline earth metal ion is bonded to the surface of the colloidal silica particle contained in the silica sol in a ratio of 0.001 to 0.2 pieces per square nanometer of the surface area of the colloidal silica particle, so as to bond the alkaline earth metal ion to the surface of the colloidal silica particle; and (C"): exchanging water which is a dispersion medium of the aqueous silica sol obtained in the process (A') with a reactive monomer.

The process (A') is similar to the process (A') in the second method of the production method of the reactive monomer-dispersed silica sol of the present invention.

The process (C") is a process for exchanging water which is a dispersion medium of the aqueous silica sol obtained in the process (A') containing colloidal silica particles in which an alkaline earth metal ion is bonded to the surface of the colloidal silica particles in a ratio of 0.001 to 0.2 pieces per square nanometer of the surface area of the colloidal silica particles with a reactive monomer. When the reactive monomer is a water-soluble monomer such as 2-hydroxyethyl (meth)acrylate, the aqueous silica sol can be exchanged with a reactive monomer directly without obtaining an organic solvent-dispersed silica sol. The reactive monomer-dispersed silica sol can be obtained by adding a reactive monomer to the aqueous silica sol obtained in the process (A') while stirring and heating the sol at 5 to 100° C. under a reduced pressure to distill off water.

A fourth method of the production method of the reactive monomer-dispersed silica sol of the present invention is a production method of a reactive monomer-dispersed silica sol for surface-modifying colloidal silica particles by adding a silane compound capable of forming a covalent bond with a silanol group of colloidal silica particles to the organic solvent-dispersed silica sol before and/or after dissolving an alkaline earth metal compound in the process (A) of the first method.

A fifth method of the production method of the reactive monomer-dispersed silica sol of the present invention is a production method of a reactive monomer-dispersed silica sol for surface-modifying colloidal silica particles by adding a silane compound capable of forming a covalent bond with a silanol group of the colloidal silica particles to the aqueous silica sol before and/or after dissolving an alkaline earth metal compound in the process (A') of the second method, or by adding the silane compound to the organic solvent-dispersed silica sol in the process (B') of the second method.

A sixth method of the production method of the reactive monomer-dispersed silica sol of the present invention is a production method of a reactive monomer-dispersed silica sol for surface-modifying colloidal silica particles by adding a silane compound capable of forming a covalent bond with a silanol group of colloidal silica particles to the aqueous silica sol before and/or after dissolving an alkaline earth metal compound in the process (A') of the third method.

In the fourth to sixth methods, the silane compound may be added to an aqueous silica sol or an organic solvent-dispersed silica sol either before or after adding an alkaline earth metal compound to the aqueous silica sol or the organic solvent-dispersed silica sol. However, because the addition of silane compound to the silica sol has an effect of suppressing an aggregation of colloidal silica particles by adding an alkaline earth metal ion, it is preferable to add the silane compound before adding the alkaline earth metal compound. While adding the silane compound to the aqueous silica sol or the organic solvent-dispersed silica sol, the aqueous silica sol or the organic solvent-dispersed silica sol is preferably stirred, and the silane compound is preferably added gradually. Though the temperature of the silica sol while adding the silane compound is not particularly limited so long as it is a temperature at which a silanol group of colloidal silica particles and the silane compound can form a covalent bond, the temperature is generally 5° C. to a boiling temperature of the dispersion medium. In addition, after adding the silane compound, the mixture may be aged for around 1 to 10 hours, for sufficiently effecting the reaction between the silanol group of colloidal silica particles and the silane compound. The temperature of the silica sol during the aging is 5° C. to a boiling temperature of the dispersion medium, preferably 20° C. to a boiling temperature of the dispersion medium.

Since the colloidal silica particles are surface-modified by the silane compound, the aggregation of the colloidal silica particles by the alkaline earth metal ion can be suppressed when adding an alkaline earth metal compound to the silica sol. In addition, the surface modification may enhance the dispersibility of the colloidal silica particles in a reactive monomer.

Hereinafter, the curable composition containing a reactive monomer-dispersed silica sol and a monomer curing agent, and the cured article thereof of the present invention are described in detail.

The curable composition of the present invention is obtained by adding a monomer curing agent to the reactive monomer-dispersed silica sol of the present invention. The monomer curing agent in the present invention is a compound generally called as a polymerization initiator, and when the reactive monomer is an epoxy monomer, an epoxy curing agent is also included therein. Examples of the polymerization initiator include: a compound capable of causing a radical polymerization of a reactive monomer by generating an active radical by heating or light irradiation, that is, a radical polymerization initiator; and a compound capable of causing a cationic polymerization of a reactive monomer by generating cation species such as a protonic acid and a carbon cation by heating or light irradiation, that is, a cationic polymerization initiator.

Examples of the radical polymerization initiator include peroxides, azo compounds, disulfides, sulfinic acids, imidazole compounds, diazo compounds, bisimidazole compounds, N-arylglycin compounds, organic azide compounds, titanocene compounds, aluminate compounds, N-alkoxypyridinium salt compounds and thioxanthone compounds. Specific examples of the peroxide include acetyl peroxide, lauroyl peroxide, benzoyl peroxide, cumenehydro peroxide, di-tertbutyl peroxide, potassium peroxosulfate, ammonium peroxosulfate and hydrogen peroxide. Examples of the azo compounds include 2,2-azobisisobutylonitrile. Examples of the disulfides include tetramethylthiuram disulfide and dibenzoyl disulfide. Examples of the sulfinic acids include p-toluene sulfinic acid. Examples of the azide compounds include p-azide benzaldehyde, p-azide acetophenone, p-azide benzoate, p-azidebenzalacetophenone, 4,4'-diazide chalcone, 4,4'-diazide diphenyl sulfide and 2,6-bis(4'-azide benzal)-4-methylcyclohexanone. Examples of the diazo compounds include 1-diazo-2,5-diethoxy-4-p-tolylmercaptobenzene borofluoride, 1-diazo-4-N,N-dimethylaminobenzene chloride and 1-diazo-4-N,N-diethylaminobenzene borofluoride. Examples of the bisimidazole compounds include 2,2'-bis(o-chlorophenyl)-4,5,4',5'-tetrakis(3,4,5-trimethoxyphenyl) 1,2'-bisimidazole and 2,2'-bis(o-chlorophenyl)-4,5,4',5'-tetraphenyl-1,2'-bisimidazole. Examples of the titanocene compounds include dicyclopentadienyl-titanium-dichloride, dicyclopentadienyl-titanium-bisphenyl, dicyclopentadienyl-titanium-bis(2,3,4,5,6-pentafluorophenyl), dicyclopentadienyl-titanium-bis(2,3,5,6-tetrafluorophenyl), dicyclopentadienyl-titanium-bis(2,4,6-trifluorophenyl), dicyclopentadienyl-titanium-bis(2,6-difluorophenyl), dicyclopentadienyl-titanium-bis(2,4-difluorophenyl), bis(methylcyclopentadienyl)-titanium-bis(2,3,4,5,6-pentafluorophenyl), bis(methylcyclopentadienyl)-titanium-bis(2,3,5,6-tetrafluorophenyl), bis(methylcyclopentadienyl)-titanium-bis(2,6-difluorophenyl) and dicyclopentadienyl-titanium-bis(2,6-difluoro-3-(1H-pyrrol-1-yl)phenyl).

Examples of the radical polymerization initiator also include 1,3-di(tert-butyldioxycarbonyl)benzophenone, 3,3', 4,4'-tetrakis(tert-butyldioxycarbonyl)benzophenone, 3-phenyl-5-isooxazolone, 2-mercaptobenzimidazole, 2,2-dimethoxy-1,2-diphenylethane-1-one, 1-hydroxycyclohexyl-phenyl-ketone and 2-benzyl-2-dimethylamino-1-(4-morpholinophenyl)-butanone.

Examples of the cationic polymerization initiator include hydrogen acids, sulfonate esters, sulfonimide compounds, disulfonyl diazomethane compounds, dialkyl-4-hydroxysulfonium salts, p-nitrobenzyl arylsulfonate ester, silanol-aluminum complexes and (η6-benzene)(η5-cyclopentadienyl) iron (II). Examples of the hydrogen acids include hydrochloric acid, phosphoric acid and sulfuric acid. Examples of the sulfonimide compounds include N-(trifluoromethanesulfonyloxy)succinimide, N-(nonafluoro-n-butanesulfonyloxy) succinimide, N-(camphorsulfonyloxy)succinimide and N-(trifluoromethanesulfonyloxy)naphthalimide. Examples of the disulfonyl diazomethane compounds include bis(trifluoromethylsulfonyl)diazomethane, bis(cyclohexylsulfonyl) diazomethane, bis(phenylsulfonyl)diazomethane, bis(p-toluenesulfonyl)diazomethane, bis(2,4-dimethylbenzenesulfonyl)diazomethane and methylsulfonyl-p-toluenesulfonyldiazomethane.

Examples of the cationic polymerization initiator also include 2-methyl-1-(4-methylthiophenyl)-2-morpholinopropane-1-one.

In addition, aromatic iodonium salt compounds, aromatic sulfonium salt compounds, aromatic diazonium salt compounds, aromatic phosphonium salt compounds, triazine compounds, iron-arene complex compounds, and the like can be used as both a radical polymerization initiator and a cationic polymerization initiator.

Examples of the aromatic iodonium salt compounds include diphenyliodoniumhexafluorophosphate, diphenyliodoniumtrifluoromethanesulfonate, diphenyliodoniumnonafluoro-n-butanesulfonate, diphenyliodoniumperfluoro-n-octanesulfonate, diphenyliodoniumcamphorsulfonate, bis(4-tert-butylphenyl)iodoniumcamphorsulfonate and bis(4-tert-butylphenyl) iodoniumtrifluoromethanesulfonate. Examples of the aromatic sulfonium salt compounds include triphenylsulfoniumhexafluoroantimonate, triphenylsulfoniumnonafluoro-n-butanesulfonate, triphenylsulfoniumcamphorsulfonate and triphenylsulfoniumtrifluoromethanesulfonate.

In the present invention, the above monomer curing agents may be used individually or in combination of two or more types thereof.

In addition, when the reactive monomer is a compound having an epoxy ring, a monomer curing agent generally called as an epoxy curing agent can be used. The epoxy curing agent is a bifunctional compound easily reacted with an epoxy group or a hydroxyl group, and when the agent is reacted with a compound having at least two epoxy groups, a ring opening and a reaction with a hydroxyl group occur, so that a crosslinkage bond is generated and a resin having a three dimensional structure is produced.

As the epoxy curing agent, generally used are amines or acid anhydrides, and besides them, phenol resins, urea resins, polyamide resins etc. are also used. Specific examples of the amines include diethylenetriamine, isophoronediamine, diaminodiphenylmethane and diaminodiphenylsulfon; specific examples of the acid anhydride include methylhexahydrophthalic anhydride, 1,2-cyclohexanedicarboxylic anhydride, bicyclo(2.2.1)hepta-5-en-2,3-dicarboxylic anhydride, phthalic anhydride, pyromellitic dianhydride, hexahydrophthalic anhydride, dodecenylsuccinic anhydride, dichloromaleic anhydride, chlorendic anhydride and tetrachlorophthalic anhydride; and specific examples of the phenolic resin include phenolnovolak resins and cresolnovolak resins.

When the monomer curing agent is a polymerization initiator, the additive amount thereof is usually in a range of about 10 ppm to 20% by mass, based on the amount of the reactive monomer. In addition, when the monomer curing agent is an epoxy curing agent used relative to a reactive monomer having an epoxy ring, usually added is an epoxy curing agent in such an amount that the number of epoxy rings of the epoxy monomer is the same as the number of reactive functional groups of the curing agent.

In the curable composition of the present invention, as other additives, curing accelerators, fillers, colorants, thixotropic agents, and other reactive monomers or oligomers thereof can be added. When the reactive monomer is an epoxy monomer, examples of the curing accelerator include: imidazoles such as 2-methylimidazole and 2-ethyl-4-methylimidazole; amines such as 2,4,6-tris(dimethylaminomethyl)phenol and benzyldimethylamine; organophosphorus compounds such as triphenylphosphine and tributylphosphine; and quaternary phosphonium salts such as triphenylmonoalkylphosphonium halides represented by triphenylethylphosphonium bromide or the like.

When a monomer curing agent is added to the reactive monomer-dispersed silica sol obtained according to the present invention, the method of adding the agent is not particularly limited. However, it is preferred that the monomer curing agent is added while stirring the silica sol, in order to homogeneously mix the monomer curing agent in the silica sol. When the dispersion medium of the reactive monomer-dispersed silica sol is a mixed dispersion medium of a reactive monomer and an organic solvent, the curable composition to be obtained contains the organic solvent. However, by subjecting this curable composition to a pressure-reducing treatment or a heating treatment to remove the organic solvent, a curable composition containing no organic solvent may be produced. By these methods, the curable composition of the present invention can be obtained.

The cured article of the present invention can be obtained by polymerizing the above curable composition by heating or light irradiation. When the curable composition contains an organic solvent, it is preferred that the polymerization is performed after the organic solvent is appropriately removed.

The shape of the cured article takes various forms according to applications, such as a transparent plastic plate, a lens, a bottle, a thin film like a hard coating film such as a film, various sealants and molded articles.

EXAMPLES

Production of Reactive Monomer-dispersed Silica Sol

Example 1

800 g of a methanol-dispersed silica sol (MT-ST; manufactured by Nissan Chemical Industries, Ltd.; particle diameter measured by the BET method: 12 nm, $SiO_2$ concentration: 30% by mass, methanol: 68% by mass, water content: 2% by mass) was charged into a glass reactor having a content volume of 1 L and equipped with a stirrer, and while stirring the sol, 30.4 g of γ-acryloxypropyltrimethoxysilane (trade name: KBM-5103; manufactured by Shin-Etsu Chemical Co., Ltd.) was added to the sol, followed by retaining the resultant mixture at a liquid temperature of 50° C. for 4 hours. While stirring the obtained sol at 50° C., 3.40 g of 5.0% by mass calcium methoxide methanol slurry was added to the sol, and by continuing to stir the resultant mixture for 60 minutes, calcium methoxide was thoroughly dissolved to obtain 835 g of a methanol-dispersed calcium-bonded silica sol. Next, the sol was transferred to an egg plant-shaped flask having a content volume of 2 L, and 560 g of an acrylic monomer (substance name: tetrahydrofurfuryl acrylate; trade name: VISCOAT #150; manufactured by Osaka Organic Chemical Industry Ltd.) was added thereto. Subsequently, while heating the reaction mixture at a water bath temperature of 40° C. under a reduced pressure of 40 hPa, methanol was distilled off by an evaporator to obtain 833 g of a colorless transparent acrylic monomer-dispersed silica sol ($SiO_2$ concentration: 30% by mass, tetrahydrofurfuryl acrylate: 70% by mass, B-type viscosity at 20° C.: 9.8 mPa·s, water content: 0.1% by mass, methanol: 0.2% by mass, Ca ions per square nanometer of the surface area of the surface of the colloidal silica particle: 0.019 pieces). A part of the sol was encapsulated in a glass container and the container was retained in a warm reservoir at 50° C. for one month. Subsequently, the B-type viscosity of the sol at 20° C. was measured and found to be 9.9 mPa·s and the sol was stable. In addition, the appearance of the sol remained in colorless and transparent.

Example 2

While stirring 2,346 g of an acidic aqueous silica sol (Snowtex (registered trademark) O; manufactured by Nissan Chemical Industries, Ltd.; particle diameter measured by the BET method: 12 nm, $SiO_2$ concentration: 20% by mass, water: 80% by mass, pH: 2.8) using a disperser at a rotation speed of 1,000 rpm in a polyethylene container having a content volume of 3 L, 0.211 g of calcium hydroxide in a powder form was added to the silica sol, and the calcium hydroxide was dissolved in the silica sol by stirring the resultant mixture at 25° C. for 60 minutes to obtain a calcium-bonded aqueous silica sol. 1,572 g of the sol was charged into a glass reactor having a content volume of 2 L and equipped with a stirrer, a condenser, a thermometer and two inlets. While boiling the sol in the reactor, vapor of methanol generated by another boiler was continuously blown into the silica sol in the reactor to perform the exchange of water with methanol. When the volume of the distillate became 13 L, the exchange was terminated to obtain 1,570 g of a methanol-dispersed calcium-bonded silica sol ($SiO_2$ concentration: 20% by mass, methanol: 78% by mass, water content: 1.5% by mass). Next, 1,200 g of the sol was transferred to an egg plant-shaped flask having a content volume of 3 L, and 32.0 g of γ-methacryloxypropyltrimethoxysilane (trade name: KBM-503; manufactured by Shin-Etsu Chemical Co., Ltd.) was added thereto, followed by retaining the resultant mixture at a liquid temperature of 50° C. for 4 hours while stirring by a magnetic stirrer. Next, to the mixture, 560 g of an acrylic monomer (substance name: tetrahydrofurfuryl acrylate; trade name: VISCOAT #150; manufactured by Osaka Organic Chemical Industry Ltd.) was added, and thereafter, while heating the reaction mixture at a water bath temperature of 40° C. under a reduced pressure of 40 hPa, methanol was distilled off by an evaporator to obtain 835 g of a colorless transparent acrylic monomer-dispersed silica sol ($SiO_2$ concentration: 30% by mass, tetrahydrofurfuryl acrylate: 70% by mass, B-type viscosity at 20° C.: 11.0 mPa·s, water content: 0.1% by mass, methanol: 0.2% by mass, Ca ions per square nanometer of the surface area of the surface of the colloidal silica particle: 0.016 pieces). A part of the sol was encapsulated in a glass container and the container was retained in a warm reservoir at 50° C. for one month. Subsequently, the B-type viscosity of the sol at 20° C. was measured and found to be 11.2 mPa·s and the sol was stable. In addition, the appearance of the sol remained in colorless and transparent.

Example 3

800 g of a methanol-dispersed silica sol (MT-ST; manufactured by Nissan Chemical Industries, Ltd.; particle diameter measured by the BET method: 12 nm, $SiO_2$ concentration: 30% by mass, methanol: 68% by mass, water content: 2% by mass) was charged into a glass reactor having a content volume of 1 L and equipped with a stirrer, a condenser, a thermometer and two inlets, and while distilling the silica sol under atmospheric pressure with stirring the silica sol and maintaining the liquid level constant, 592 g of acetonitrile was added to the silica sol to obtain an acetonitrile-methanol mixed solvent sol ($SiO_2$ concentration: 30% by mass, methanol concentration: 20% by mass, acetonitrile: 49% by mass, water content: 1% by mass). While thoroughly stirring the sol, 4.0 g of hexamethyldisiloxane was added to the sol and the resultant mixture was heated at 55° C. for 2 hours, followed by further adding 400 g of acetonitrile thereto. Next, 4.37 g of a 5.0% by mass calcium methoxide methanol slurry was added to the sol, and the sol was heated at in a range of 50 to 55° C. for two hours to thoroughly dissolve the calcium methoxide. The obtained sol was transferred to a 2 L egg plant-shaped flask and while distilling off the solvent under a reduced pressure of 450 hPa by a rotary evaporator, 1,395 g of acetonitrile was added to the sol to obtain 803 g of an acetonitrile-dispersed calcium-bonded silica sol ($SiO_2$ concentration: 20.5% by mass, acetonitrile: 79.2% by mass, Ostwald viscosity at 20° C.: 1.2 mPa·s, water content: 0.1% by mass, methanol concentration: 0.2% by mass, Ca ions per square nanometer of the surface area of the surface of the colloidal silica particle: 0.023 pieces). 54.6 g of the sol was transferred to an egg plant-shaped flask having a content volume of 300 mL, and 37.3 g of an epoxy monomer (substance name: 3,4-epoxycyclohexylmethyl-3',4'-epoxycyclohexane carboxylate; trade name: CELLOXIDE 2021P; manufactured by Daicel Chemical Industries, Ltd.) were added to the sol. By condensing the silica sol by an evaporator while heating at a water bath temperature of 50° C. under a reduced pressure of 100 hPa, acetonitrile was distilled off to obtain 48.5 g of a pale yellow transparent epoxy monomer-dispersed silica sol ($SiO_2$ concentration: 22.9% by mass, acetonitrile: 0.9% by mass, 3,4-epoxycyclohexylmethyl-3',4'-epoxycyclohexane carboxylate: 76% by mass, B-type viscosity at 40° C.: 1,500 mPa·s). A part of this epoxy monomer-dispersed silica sol was encapsulated in a glass container, and the container was preserved at 50° C. for one month. Then, the B-type viscosity of the silica sol at 40° C. was measured and found to be 1,490 mPa·s, and the silica sol was stable. In addition, there was no change in the appearance color of the sol.

Example 4

While stirring 300 g of an acidic aqueous silica sol (Snowtex (registered trademark) O; manufactured by Nissan Chemical Industries, Ltd.; particle diameter measured by the BET method: 12 nm, $SiO_2$ concentration: 20% by mass, water: 80% by mass, pH: 2.8) using a disperser at a rotation speed of 1,000 rpm in a polyethylene container having a content volume of 500 mL, 0.026 g of calcium hydroxide in a powder form was added to the silica sol. By stirring the resultant mixture at 25° C. for 60 minutes, the calcium hydroxide was dissolved to obtain a calcium-bonded aqueous silica sol. The sol was transferred to an egg plant-shaped flask having a content volume of 1 L, and 138.2 g of 2-hydroxyethylmethacrylate (reagent; manufactured by Kanto Chemical Industry Co., Ltd.) was added to the sol. Subsequently, by condensing the silica sol by an evaporator while heating at a water bath temperature of 50° C. under a reduced pressure of 20 hPa, a colorless transparent 2-hydroxyethyl methacrylate-dispersed silica sol ($SiO_2$ concentration: 31% by mass, 2-hydroxyethyl methacrylate: 68% by mass, water content: 1% by mass, B-type viscosity at 20° C.: 28.5 mPa·s, Ca ions per square nanometer of the surface area of the surface of the colloidal silica particle: 0.015 pieces) was obtained. A part of this silica sol was encapsulated in a glass container and the container was retained at 50° C. in a warm reservoir for one month. Then, the B-type viscosity of the silica sol at 20° C. was measured and found to be 28.7 mPa·s, and the silica sol was stable. In addition, the appearance of the silica sol was remained in colorless and transparent.

Comparative Example 1

The production operation of a silica sol was performed in a similar manner to the operation in Example 1, except that calcium methoxide was not added. Then, in a process for distilling off methanol by an evaporator after adding an acrylic monomer, the viscosity of the sol rapidly increased and a polymerization of the monomer occurred, so that a stable acrylic monomer-dispersed silica sol was not obtained.

Comparative Example 2

The production operation of a silica sol was performed in a similar manner to the operation in Example 2, except that calcium hydroxide was not added. Then, in a process for distilling off methanol by an evaporator after adding an acrylic monomer, the viscosity of the sol rapidly increased and a polymerization of the monomer occurred, so that a stable acrylic monomer-dispersed silica sol was not obtained.

Comparative Example 3

The production operation of a silica sol was performed in a similar manner to the operation in Example 3, except that calcium methoxide was not added. Then, in a process for distilling off acetonitrile by an evaporator after adding an epoxy monomer, the viscosity of the sol rapidly increased and a polymerization of the monomer occurred, so that a stable epoxy monomer-dispersed silica sol was not obtained.

Comparative Example 4

The production operation of a silica sol was performed in a similar manner to the operation in Example 4, except that calcium hydroxide was not added. Then, an orange color transparent 2-hydroxylethyl methacrylate-dispersed silica sol ($SiO_2$ concentration: 31% by mass, 2-hydroxyethyl methacrylate: 68% by mass, water content: 1% by mass, B-type viscosity at 20° C.: 21.4 mPa·s) was obtained. A part of this sol was encapsulated in a glass container and the container was retained in a warm reservoir at 50° C. for one month. Then, the B-type viscosity of the silica sol at 20° C. was measured and found to be 21.5 mPa·s, and the silica sol was stable, however, the appearance of the sol was colored in red.

Example 5

Production of Cured Article

The tetrahydrofurfuryl acrylate-dispersed silica sol produced in Example 1, and tetrahydrofurfuryl acrylate and ethoxylated trimethylolpropane triacrylate (trade name: V #360; manufactured by Osaka Organic Chemical Industry Ltd.) were mixed, and then a photopolymerization initiator (trade name: Irgacure 184; manufactured by Ciba Specialty Chemicals Inc) was added to the resultant mixture, followed by dissolving the solid of the mixture by thoroughly stirring the mixture to produce colorless transparent curable compositions 1 to 4 having compositions shown in Table 1.

These curable compositions were filtered using a chromatodisc (MILLEX-AP; manufactured by Nihon Millipore K.K.; pore diameter: 2.0 μm), and then about 1 mL of each of the filtrates was dropped on a glass substrate having a thickness of 0.7 mm on which an indium tin oxide (ITO) film as a transparent conductive film was formed on the entire surface of the substrate by sputtering. Films were formed by rotating the substrate at a rotation speed of 3,000 rpm for 10 seconds after a preliminary rotation at a rotation speed of 100 rpm for 5 seconds using a spin coater (K359SD-270SPINNER; manufactured by Kyowariken Co., Ltd.). By irradiating light to the formed films using a high pressure mercury lamp (H13100A-1; manufactured by Sen Lights Corporation) for 20 minutes, cured coating films were obtained.

With respect to the obtained cured coating films on the glass substrates coated with ITO films, the surface hardness was measured according to JIS-K5400 "Pencil hardness test method" (Table 1). The obtained cured coating films exhibited high scratch hardness.

TABLE 1

|  | Curable composition 1 | Curable composition 2 | Curable composition 3 | Curable composition 4 |
|---|---|---|---|---|
| Silica (parts by mass) | 3.0 | 1.5 | 0.75 | 0 |
| Tetrahydrofurfuryl acrylate (parts by mass) | 7.0 | 7.0 | 7.0 | 7.0 |
| Trimethylolpropane EO-adduct acrylate (parts by mass) | 3.0 | 3.0 | 3.0 | 3.0 |
| Irgacure 184 (parts by mass) | 0.5 | 0.5 | 0.5 | 0.5 |
| Scratch hardness of cured coating film (pencil method) | >9 H | >9 H | 6 H | 3 H |

INDUSTRIAL APPLICABILITY

The reactive monomer-dispersed silica sol of the present invention has a low solid acidity of the surface of the colloidal silica particle, can suppress the deterioration, the degradation etc. of a resin in comparison with a silica sol in which an alkaline earth metal ion is not bonded to the surface of the particle, and can be used as a raw material for a microfiller of a hard coating film or a thin film to be formed on the surface of a synthetic resin molded article such as a lens, a bottle, a film and a transparent plastic plate. In addition, from the curable composition of the present invention, a cured article having high hardness, such as a resin molded article can be obtained.

The invention claimed is:

1. A production method of a reactive monomer-dispersed silica sol, comprising the following (A) and (B):
   (A): dissolving an alkaline earth metal compound in an organic solvent-dispersed silica sol in an amount in which an alkaline earth metal ion is bonded to a surface of a colloidal silica particle contained in the silica sol so that a number of the alkaline earth metal ion bonded to the surface of the colloidal silica particle becomes 0.001 to 0.2 per square nanometer ($nm^2$) of the surface area of the colloidal silica particle; and
   (B): exchanging an organic solvent which is a dispersion medium of the organic solvent-dispersed silica sol obtained in (A) with a reactive monomer.

2. The production method of a reactive monomer-dispersed silica sol according to claim 1, wherein the alkaline earth metal compound is an organic acid salt and/or alkoxide of calcium or magnesium.

3. The production method of a reactive monomer-dispersed silica sol according to claim 1, wherein the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure.

4. The production method of a reactive monomer-dispersed silica sol according to claim 1, wherein further in (A), the colloidal silica particle is surface-modified by adding a silane compound capable of forming a covalent bond with a silanol group of the colloidal silica particle to an organic solvent-dispersed silica sol before and/or after an alkaline earth metal compound is dissolved in the sol.

5. A production method of the reactive monomer-dispersed silica sol, comprising the following (A'), (B') and (C'):
   (A'): dissolving an alkaline earth metal compound in an aqueous silica sol in an amount in which an alkaline earth metal ion is bonded to a surface of a colloidal silica particle contained in the silica sol so that a number of the alkaline earth metal ion bonded to the surface of the colloidal silica particle becomes 0.001 to 0.2 per square nanometer ($nm^2$) of the surface area of the colloidal silica particle;
   (B'): exchanging water which is a dispersion medium of the aqueous silica sol obtained in (A') with an organic solvent to obtain an organic solvent-dispersed silica sol; and
   (C'): exchanging an organic solvent which is a dispersion medium of the organic solvent-dispersed silica sol obtained in (B') with a reactive monomer.

6. The production method of a reactive monomer-dispersed silica sol according to claim 5, wherein the alkaline earth metal compound is at least one type of compound selected from a group consisting of calcium hydroxide, magnesium hydroxide, calcium oxide and magnesium oxide.

7. The production method of a reactive monomer-dispersed silica sol according to claim 5, wherein the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure.

8. The production method of a reactive monomer-dispersed silica sol according to claim 5, wherein the colloidal silica particle is surface-modified, either by adding a silane compound capable of forming a covalent bond with a silanol group of the colloidal silica particle to the aqueous silica sol before and/or after an alkaline earth metal is dissolved in the sol in (A'), or by adding the silane compound to the organic solvent-dispersed silica sol in (B').

9. A production method of the reactive monomer-dispersed silica sol, comprising the following (A') and (C"):
   (A'): dissolving an alkaline earth metal compound in an aqueous silica sol in an amount in which an alkaline earth metal ion is bonded to a surface of a colloidal silica particle contained in the silica sol so that a number of the alkaline earth metal ion bonded to the surface fo the colloidal silica particle becomes 0.001 to 0.2 per square nanometer of the surface area of the colloidal silica particle; and
   (C"): exchanging water which is a dispersion medium of the aqueous silica sol obtained in (A') with a reactive monomer.

10. The production method of a reactive monomer-dispersed silica sol according to claim 9, wherein the alkaline earth metal compound is at least one type of compound selected from a group consisting of calcium hydroxide, magnesium hydroxide, calcium oxide and magnesium oxide.

11. The production method of a reactive monomer-dispersed silica sol according to claim 9, wherein the reactive monomer is at least one type of compound selected from a group consisting of a polymerizable compound having an ethylenic unsaturated bond, a polymerizable compound having an epoxy ring, a polymerizable compound having an oxetane ring and a polymerizable compound having a vinyl ether structure.

12. The production method of a reactive monomer-dispersed silica sol according to claim 9, wherein further in (A'), the colloidal silica particle is surface-modified by adding a silane compound capable of forming a covalent bond with a silanol group of the colloidal silica particle to the aqueous silica sol before and/or after an alkaline earth metal compound is dissolved in the sol.

* * * * *